Sept. 26, 1939.    H. ROSE    2,174,042
FLOW AND TEMPERATURE REGULATOR FOR AUTOMOTIVE VEHICLE ENGINE COOLING SYSTEMS
Filed April 10, 1935
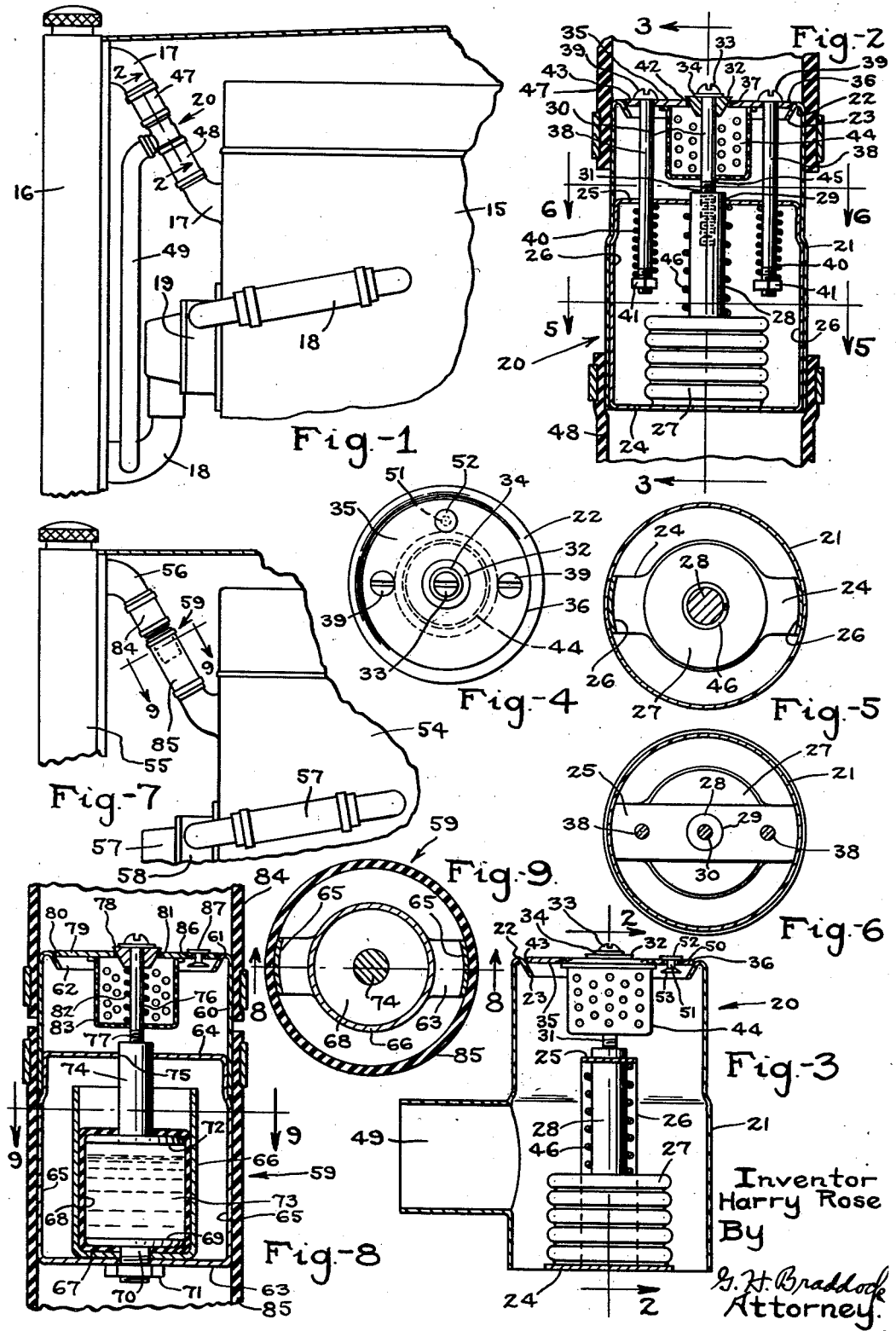
Inventor
Harry Rose
By
G. H. Braddock
Attorney Patented Sept. 26, 1939

2,174,042

UNITED STATES PATENT OFFICE 2,174,042

FLOW AND TEMPERATURE REGULATOR FOR AUTOMOTIVE VEHICLE ENGINE COOLING SYSTEMS

Harry Rose, Wyandotte, Mich.

Application April 10, 1935, Serial No. 15,626

9 Claims. (Cl. 236—34)

This invention relates to automotive vehicle engine cooling systems, and has more especial reference to a device or mechanism for regulating the flow and temperature of the fluid employed in an automotive vehicle engine as the cooling medium therefor.

An object of the invention is to provide an automotive vehicle engine cooling system or arrangement including novel and improved means adapted to the purpose of quickly procuring a predetermined and desired temperature of the cooling medium or fluid of the system, upon the starting up of the engine, designed to promote the maximum in motor efficiency, and of continuously and substantially accurately maintaining said predetermined and desired temperature.

A further object is to provide an automotive vehicle engine cooling system equipped with novel and improved means for continuously and substantially accurately regulating the amount of flow of cooling medium or fluid of the system through the radiator of said automotive vehicle, whereby to regulate and control the temperature of the cooling medium or fluid, as well as the temperature of the engine.

A further object is to provide a novel and improved thermostatically actuated device for controlling the flow and temperature of cooling medium or fluid in automotive vehicle engine cooling systems.

And a further object is to provide a thermostatically actuated device for the purpose as stated, wherein will be incorporated various improved features and characteristics of construction novel both as individual entities of the device and in combination.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a fragmentary elevational view of an automotive vehicle engine incorporating the features of the invention;

Fig. 2 is an enlarged sectional view, taken on line 2—2 in Fig. 1, or as on line 2—2 in Fig. 3, detailing the thermostatically actuated flow and temperature controlling device;

Fig. 3 is a sectional view, taken as on line 3—3 in Fig. 2;

Fig. 4 is a plan view of the thermostatically actuated device, removed from the engine, as it would appear from the top of the sheet in Fig. 2;

Fig. 5 is a detail sectional view, taken as on line 5—5 in Fig. 2;

Fig. 6 is a detail sectional view, taken as on line 6—6 in Fig. 2;

Fig. 7 is a fragmentary elevational view of an automotive vehicle engine including a modified type of thermostatically actuated flow and temperature controlling device made according to the invention;

Fig. 8 is an enlarged sectional view of the thermostatically actuated device of Fig. 7, corresponding generally with the disclosures of Fig. 3, taken as on line 8—8 in Fig. 9; and Fig. 9 is a detail sectional view taken on line 9—9 in Fig. 7, or as on line 9—9 in Fig. 8.

With respect to Figs. 1 to 6 of the drawing and the numerals of reference thereon, 15 represents the jacket of an automotive vehicle engine surrounding the engine cylinders, 16 the automotive vehicle radiator, 17 a connection between the jacket and radiator, 18 a connection between the radiator and jacket, and 19 indicates the usual pump in the connection 18. The flow of the cooling medium or fluid, which ordinarily is water, is accomplished by pressure made by the pump 19, and is from the jacket 15 to the radiator 16 through the connection 17 and from the radiator back to the jacket through the connection 18 and the pump 19.

A thermostatically actuated device, made according to the present invention and incorporated in the connection 17, is denoted generally at 20. Said device is adapted to the purpose of controlling the flow of the cooling medium or fluid, of the cooling system for the automotive vehicle engine disclosed, through the radiator 16, and by controlling the flow through the radiator, the device controls and regulates the temperature of the cooling medium or fluid, and thus obviously also controls and regulates the temperature of the engine itself.

A cylindrical housing 21 of the thermostatically actuated device is open at its lower end, and the upper end of said housing merges, as at 22, in a downwardly and inwardly extending, or tapered, annular valve seat 23 for a purpose to be made clear.

The housing 21 integrally supports a small frame which is arranged internally of the housing, said frame consisting of a lower base 24 at the bottom of the housing, an upper base 25 at an upper portion of the housing but spaced at a distance from the top thereof, and legs 26 connecting the lower and upper bases with each other. The lower base 24 and the upper base 25 extend transversely of the housing 21 across the central portion thereof, and the legs 26 are attached to the opposite end portions of the bases 24 and 25, respectively, and are soldered, welded, or otherwise fastened, to the housing wall. The lower and upper bases 24 and 25 and the legs 26 of the small frame can be a single piece or strip of material, desirably metal, or can be several pieces or strips suitably connected together. If desired, the frame can be reinforced in any convenient way to suit it to its purpose.

The lower base 24 of the small frame within the housing 21 conveniently supports a bellows, or corrugated collapsible and expansible tubular member, denoted 27, ordinarily consisting of suitable metal, the bellows or tubular member being fastened to said lower base in any convenient manner. Said bellows or tubular member 27 is of the type including fluid which expands at higher temperatures to cause the bellows or tubular member to elongate and contracts at lower temperatures to create vacuum causing the bellows or tubular member to shorten.

The top portion of the bellows 27 integrally carries an upstanding plunger or stem 28 which is slidably guided in an opening 29 in the upper base 25, and said plunger or stem 28 extends to position slightly above said upper base when the bellows or tubular member is contracted or shortened, as shown in Figs. 2 and 3.

A smaller diameter stem 30 is adjustably threaded, as denoted at 31, into the plunger or stem 28 to extend upwardly from said plunger or stem 28, and the upper portion of the stem 30 carries a conical valve 32 having its wall tapering downwardly and inwardly. The valve 32 is desirably at the longitudinal center or axis of the housing 21, and is fixed to the stem 30 in any suitable fashion. As disclosed, the conical valve is tight on said stem 30, and a slotted head 33 on the stem and a washer 34 beneath the head insure the permanent location of the valve upon the stem.

A disc plate 35 includes an outer circumferential portion 36 which is adapted to engage the annular valve seat 23, and also includes a central opening providing an inner circumferential portion 37 adapted to be engaged by the conical valve 32. The outer circumferential portion 36 engages the annular valve seat 23 when the disc plate 35 is moved downwardly, and the conical valve 32 engages the inner circumferential portion 37 when said conical valve is moved downwardly. Or, stated differently, the disc plate 35 lies between the annular valve seat 23, which is below said disc plate, and the conical valve 32, which is above said disc plate.

The inner circumferential portion 37 of the disc plate 35 constitutes an annular valve seat for the conical valve 32, and the disc plate 35 and its outer circumferential portion 36, together with said conical valve 32, constitues a valve for the annular valve seat 23. Obviously, when the conical valve 32 is engaged with the valve seat 37 and the outer circumferential portion 36 of the disc plate 35 is engaged with the valve seat 23, the housing 21 is completely closed to the passage of cooling medium or fluid from the jacket 15 to the radiator 16.

The arrangement is such that when the bellows or tubular member 27 is at lower temperatures, to hold the plunger or stem 28, the smaller diameter stem 30 and the conical valve 32 at their farthest inward or downward positions, said conical valve 32 engages against the annular valve seat 37 and presses the outer circumferential portion 36 of the disc plate 35 down against the annular valve seat 23. Thus, with the bellows or tubular member at lower temperature, both the small and the large valves are held in closed position. When the temperature of the bellows or tubular member becomes higher, the plunger or stem 28, the smaller diameter stem 30 and the conical valve 32 move outwardly or upwardly, and said conical valve 32 is removed from its seat 37 and the smaller valve is opened.

Means is provided for resiliently holding the outer circumferential portion 36 of the disc plate 35 in engagement with the annular valve seat 23, against the tendency of the conical valve to lift said disc plate and the tendency of the flowing cooling medium or fluid to open the outer, larger valve, when said conical valve is removed from its seat 37, whereby the larger valve can remain closed while the smaller valve is open. This mentioned means as disclosed includes spaced apart screw bolts 38 which pass through openings in the disc plate 35 and the upper base 25 and extend to position somewhat below said upper base at either side of the plunger or stem 28. A slotted head 39 upon each screw bolt engages the upper surface of said disc plate 35, a coil spring 40 upon each screw bolt has its upper end in engagement with the lower surface of the upper base 25, and a nut 41 adjustably threaded upon the lower end portion of each screw bolt engages the lower end of the corresponding coil spring. The nuts 41 are turned up on the screw bolts to give the coil springs the tension necessary to hold the disc plate 35 down against the annular valve seat 23 under the resilient pressure desired. Each screw bolt 38 is slidable in the upper base 25.

The inner circumferential portion 37 of the disc plate 35 includes an upper, annular knife edge 42 constituting the valve seat of the inner or smaller valve, which annular knife edge 42 is engaged by the conical valve 32, and the outer circumferential portion 36 of said disc plate includes a lower, annular knife edge 43 constituting the working surface of the outer or larger valve, which annular knife edge 43 engages the annular valve seat 23. The annular knife edges 42 and 43 are as shown provided by inner and outer circumferential or marginal edges of the disc plate disposed at right angles to the body of said disc plate. By the employment of annular knife edges such as 42 and 43, there is tendency toward keeping the engaging entities of the inner and outer valves clean, by reason of the fact that upon each opening and closing of the valves the knife edges wipe in intimate contact with the surfaces they engage. Thus the liability of accumulation of dirt and grit upon the valves and their seats tending to destroy proper seating of the valves is reduced or eliminated.

A perforated cup-shape member 44 is suitably attached, in any convenient manner, as by soldering or welding, to the lower surface of the disc plate 35 about the inner circumferential portion 37. The base of such cup-shape member 44 is disposed in slightly spaced relation to the upper end of the plunger or stem 28, and includes an opening 45 through which the smaller diameter stem 30 freely passes. It can be here stated that in a desired instance the member 44 could be a simple yoke constructed to allow cooling medium or fluid to freely pass the inner, smaller valve when open, but the arrangement as illustrated and described is preferable. In addition to an added function, to be set forth, performed by a cup-shape member, yoke, or other element, such as 44, it is the service of the cup-shape member as such to strain the cooling medium or fluid and thus keep as much dirt as possible away from the inner, smaller valve.

A coil spring 46 about the plunger or stem 28 and having its upper end pressing against the lower surface of the upper base 25 and its lower end pressing against the top surface of the bellows or tubular member 27, is for assisting the bellows or tubular member in pulling or drawing the conical valve 32 inwardly or downwardly to close the inner, smaller valve, or of alone accomplishing this service should vacuum in the bellows or tubular member when at lower temperature in any instance fail to properly function to close said inner, smaller valve.

The thermostatically actuated device 20 can be incorporated in the connection 17 in any convenient and suitable way. As shown, said device is placed in said connection 17 by the employment of two pieces of rubber hose, denoted 47 and 48, respectively, the former being clipped to an upper portion of the connection 17 and to an upper portion of the housing 21, and the latter being clipped to a lower portion of said connection and to a lower portion of said housing, the arrangement being such that the housing, the two pieces of hose and the remainder of the connection 17 provide a fluid-proof passage leading from the jacket 15 to the radiator 16.

A by-pass 49 may or may not be included, as is deemed preferable. As shown, the by-pass 49 leads from a lower portion of the housing 21 adjacent the bellows or tubular member 27 to the connection 18 in advance of the pump 19, and allows circulation of cooling medium or fluid from the jacket through the connection 17, the by-pass, the connection 18 and back to the jacket, without passage of the medium or fluid so circulated through the radiator.

The disc plate 35 includes an outlet port 50 for allowing escape of air from the housing 21. When a radiator such as 16 is filled with cooling liquid for the engine, the level of the liquid upon rising in the jacket and the connection 17 would cause air under pressure to exist in the housing 21 and beneath the smaller and larger valves of the thermostatically actuated device, when the temperature of the engine is low and said valves are as a result closed, save for an air outlet port such as 50. It is, however, desirable that an outlet port such as 50 while open to escape of air from the housing 21 be closed to the passage of cooling liquid, such as water. To this end, the air outlet port 50 is equipped with a small valve member including a stem 51 floating freely in the port, a button 52 resting upon the disc plate 35 and carrying the stem, and a valve 53 carried by the lower end of the stem and arranged in slightly spaced relation to the lower surface of the disc plate. It will be evident that air under pressure in the housing 21 cannot lift the valve 53 to close it, but will lift the button 52 to an extent allowing the air to escape past the stem 51 and the button to the upper portion of the radiator, while liquid upon flowing upwardly through the housing will lift or float the valve 53 and close the port 50 to the passage of liquid.

It has been stated hereinbefore that when the cooling medium or fluid for the engine and the bellows or tubular member 27 are at low temperature, said bellows or tubular member holds the conical valve 32 against the disc plate 35 and maintains both the inner, smaller valve and the outer, larger valve in closed position. This is the condition when the engine is at rest. Upon starting up, the temperature of the cooling medium or fluid rises, and in a short time the bellows or tubular member 27 elongates or expands sufficiently to move the conical valve 32 to open position and allow limited passage of cooling medium or fluid past the smaller valve and through the radiator. Before said conical valve commences to open, there is no flow of cooling medium or fluid, when no by-pass such as 49 is employed, the small and large valves of the thermostatically actuated device completely arresting the flow. When a by-pass is employed, the whole flow is from the engine to and through the by-pass and back to the engine after starting up and until the smaller valve commences to open. The arrangement is such, in either instance, with or without by-pass, that after the smaller valve becomes opened to a greater or less extent as the case may be, the amount of flow of cooling medium or fluid past said smaller valve and through the radiator is normally sufficient, when atmospheric temperature is not relatively high, to maintain the cooling medium or fluid throughout the cooling system at predetermined and desired temperature. Tendency toward dropping of the temperature of the cooling medium or fluid due to passage of medium or fluid through the radiator is overcome by shortening or contraction of the bellows or tubular member which moves the smaller valve toward closed position and cuts down the amount of travel of cooling medium or fluid through the radiator. This cutting down of the flow has tendency toward raising the temperature of the cooling medium or fluid and the bellows or tubular member, with consequent movement of the smaller valve toward open position and increase of flow through the radiator. Evidently, the smaller valve will have tendency toward attaining an open position of equilibrium and maintaining this position under ordinary operating conditions. With increasing amount of heat in the engine, due to any cause, such as rising atmospheric temperature, excessive work placed upon the motor, or other condition operating against the natural capacity of the radiator to dissipate heat, the position of equilibrium of the smaller valve will be a corresponding closer-to-wide-open position, and with decreasing amount of heat in the engine, the position of equilibrium of said smaller valve will be a corresponding closer-toward-completely-closed position.

Under conditions of use of the engine which are normal; that is, when the engine is operated in atmospheric temperatures which are not relatively high with respect to the temperature for which the thermostatically actuated device is set, or when the engine is not made to do excessive work; the smaller valve will be open to a greater or less extent, depending upon the particular operating conditions, and the larger valve will remain closed. A rise of the temperature of the cooling medium or fluid to, or approximately to, that temperature which causes the bellows or tubular member to move the smaller valve to wide open position, carries the upper end of the plunger or stem 28 to the elevation of the lower surface of the cup-shape member or yoke 44, and any additional rise of temperature thereafter, causes the bellows or tubular member to be further elongated or expanded, the plunger or stem 28 to be further elevated, and the large valve to commence to open through the instrumentality of said plunger or stem, which lifts the cup-shape member or yoke 44 and removes the outer circumferential portion 36 of the disc plate 35 from the annular valve seat 23, against the action of the coil springs 40. As the larger valve opens, there is still additional amount of flow of cooling medium or fluid through the radiator, and this amount of flow is yet increased with the extent of opening of said larger valve. When the larger valve, as well as the smaller valve, is open, tendency toward dropping of the temperature of the cooling medium or fluid due to passage of medium or fluid through the radiator is overcome by shortening or contraction of the bellows or tubular member which moves the larger valve toward closed position and cuts down the amount of travel of cooling medium or fluid through the radiator. The cutting down of the flow has tendency toward raising the temperature of the bellows or tubular member, as before stated, with consequent movement of the large valve toward wider open position and increase of flow of cooling medium or fluid. Like the smaller valve, the larger valve will have tendency toward attaining an open position of equilibrium and maintaining this position, but for only so long as more flow is required to hold the engine at predetermined and desired temperature than can pass the smaller valve alone when wide open. When the smaller valve can handle the necessary flow, the larger valve becomes completely closed by shortening or contraction of the bellows or tubular member with resultant inward or downward movement of the plunger or stem 28 and release of the cup-shape member or yoke 44 and the disc plate 35 to the resilient action of the coil springs 40.

It will be noted that a thermostatically actuated device of the general nature as illustrated and described includes provision for continuously and substantially accurately controlling the amount of flow of cooling medium or fluid through an engine radiator both when the flow of medium or fluid is a minimum flow and when said flow is a maximum flow, as well as for controlling the amount of flow when this has any value whatsoever between maximum and minimum. By reason of the employment of the relatively small valve, the minimum amount of flow can in the coldest of weather be a very fine stream of insufficient capacity to at any time cause the temperature of the cooling medium or fluid as a whole, or the temperature of the bellows or tubular member when heated to predetermined and desired temperature to commence the opening of the smaller valve, to be greatly or suddenly reduced. And by reason of the employment of the relatively large valve, the maximum amount of flow can in the warmest of weather be sufficient to keep the temperature of the bellows or tubular member down to predetermined and desired temperature. Obviously, the smaller valve and the larger valve will operate, and cooperate, to substantially accurately control the amount of flow through the radiator at all weather temperatures from the coldest to the warmest, and by so controlling the amount of flow, will control and regulate the temperature of the cooling medium or fluid and the engine itself. Of course, the temperature of the cooling medium or fluid will be at slightly higher value when causing the bellows or tubular member to be at its greatest elongation or expansion to hold the larger valve wide open than when causing said bellows or tubular member to be elongated or expanded only sufficiently to start the smaller valve to open, but this maximum difference in temperature of the cooling medium or fluid will be negligibly small, only a few degrees at most, to need no consideration whatsoever in the practice of the invention. The predetermined temperature hereinbefore several times mentioned, at which it is desired the cooling medium or fluid shall be maintained, is not an unvarying temperature, but one which can vary within a few degrees and not make any appreciable difference in the operation of the cooling system.

Bellows or tubular members such as 27 are exhausted, when manufactured, to have desired tensions or pulls at predetermined temperatures. In the thermostatically actuated device as illustrated and described, inward or downward and outward or upward adjustment of the smaller diameter stem 30 in the plunger or stem 28 determines the pressure with which the conical valve 32 engages the valve seat 37 of the disc plate 35, and upward and downward adjustment of the nuts 41 upon the screw bolts 38 determines the resilient pressure with which the annular portion 36 of said disc plate engages the valve seat 23. Upon adjusting the stem 30 inwardly or downwardly, the temperature of the bellows or tubular member at which the smaller valve commences to open, as well as the temperature of said bellows or tubular member at which the larger valve commences to open, will be increased, assuming the nature of the bellows or tubular member to be at this time unaltered, and upon adjusting said stem 30 outwardly or upwardly, the temperatures of the belows or tubular member at which said smaller and larger valves, respectively, commence to open will be decreased, as will be evident. The smaller and larger valves will, naturally, after becoming opened, become closed at temperatures of the bellows or tubular member just less than those causing the valves to open.

While the thermostatically actuated device has been described as for controlling the temperature of automotive vehicle engines, it is to be understood that said device can be applied in any engine or apparatus the temperature of which can be controlled by blocking flow of cooling medium or fluid, or otherwise controlling flow of cooling medium or fluid through a radiator or equivalent.

A typical installation of a thermostatically actuated device constructed in the general manner as illustrated and described and employed in connection with an engine incorporating no bypass such as 49, may, merely by way of example, function about as follows. Supposing the engine started up and the automotive vehicle having the engine driven at thirty miles per hour, more or less, in weather temperature 15° F., more or less, the cooling medium or fluid, and hence the bellows or tubular member 27, may at the end of one and one-half to three miles reach a temperature of, say, 160° F., more or less, depending upon the setting of the device. At this temperature of the cooling medium or fluid and the bellows or tubular member, the smaller valve will commence to open, and cooling medium or fluid, say water, will commence to flow through the radiator in a small stream driven by pump 19. At the commencement of flow, the radiator will show no sign of heat absorption, but later will show a rise in temperature due to the warm stream of water. Eventually, the radiator temperature will reach 160°, more or less, but will not rise above the predetermined and desired temperature for which the thermostatically actuated device is set, by reason of the great capacity for heat dissipation of said radiator. Or, stated differently, the radiator, the cooling water and the bellows or tubular member will reach a condition of heat balance, and the smaller valve will thus attain and maintain one of its open positions of equilibrium. With tendency toward decrease of temperature of the cooling water by loss of heat, as by drop in weather temperature or less work required of the engine, the smaller valve will move toward closed position, in the manner as before stated, and with tendency toward increase of temperature of the cooling water by accumulation of heat, as by rise in weather temperature or more work required of the engine, the smaller valve will move toward open position, in the manner as also before set forth. The position of the smaller valve will determine the amount of water at any time travelling through the radiator, and the amount of water subjected to the cooling influence of the radiator will in turn control the temperature of the cooling water as a whole and the temperature of the bellows or tubular member, which bellows or tubular member in turn controls the position of the smaller valve. When the dissipation of heat at the radiator is not sufficient to overcome a generally rising temperature of the engine, as when the weather temperature rises considerably or when the engine is made to do excessive work, the smaller valve will move to wide open position, and if at this time the amount of water which passes the smaller valve and the radiator is insufficient to arrest the condition of generally rising temperature of the engine, the bellows or tubular member will be still further elongated or expanded to cause the larger valve to commence to open. The opening of said larger valve, in the manner as before stated, will have no tendency toward closing the smaller valve, because the outward or upward movement of the plunger or stem 28 which causes the larger valve to open carries the conical valve 32 outwardly or upwardly to the same extent that said larger valve is opened. And the larger valve will close upon inward or downward movement of said plunger or stem 28 while the smaller valve is wide open, as wil be apparent. With both the smaller and larger valves open, the larger valve will attain and maintain one of its positions of equilibrium in the manner as hereinbefore appears. With decrease of temperature of the cooling water, said larger valve will move toward closed position and will become completely closed when the amount of flow through the wide open smaller valve becomes sufficient to maintain the predetermined and desired temperature of the cooling water. With increase of temperature of the cooling water when the larger valve is open, said larger valve will move toward wider open position. The position of the larger valve when open will determine the amount of water at any time flowing through the radiator, and the amount of water subjected to the cooling influence of the radiator will in turn control the temperature of the cooling water as a whole and the temperature of the bellows or tubular member, which bellows or tubular member in turn cooperates with the coil springs 40 to control the position of the larger valve when in any of its open positions. When both the smaller and the larger valves are wide open, there will be sufficient flow of cooling water through the radiator to maintain the whole of the cooling water at predetermined and desired temperature in maximum weather temperatures and during periods when the engine is made to do excessively heavy work. It will be seen, then, that the thermostatically actuated device has capacity to continuously and substantially accurately control both the flow and temperature of the cooling medium of an automotive vehicle engine under any condition of use in climates where there is great variation in weather temperature conditions.

Supposing the same thermostatically actuated device as above described employed in connection with an engine incorporating a by-pass such as 49, the temperatures will have tendency to rise a few degrees higher than in an instance where no by-pass is used and level off at the slightly higher temperatures reached, for the reason that with by-pass incorporated, the pump pressure operative to force cooling medium or fluid through the radiator is reduced and less medium or fluid flows through said radiator as a consequence. The cooling effect is thus evidently lessened, and the temperature of the whole cooling system is slightly raised.

Thermostatically actuated devices now of commerce for the same general purpose as the device of the invention, have either the defect that they cannot allow sufficiently small amounts of cooling medium or fluid to be circulated through engine radiators in cold or winter weather to continuously maintain the engines at temperature not below that which is desirable, especially when the engines are doing light work in extremely cold weather, or the defect that they cannot allow sufficiently large amounts of cooling medium or fluid to be circulated through said radiators in warm or summer weather to continuously maintain the engines at temperature not above that which is desirable, especially when the engines are required to do heavy work in extremely warm weather. That is, devices now of commerce of the same general nature as the device of the application are not satisfactory under all conditions of use to which an automotive vehicle engine may be put. The thermostatically actuated device which I have devised incorporates features which obviously overcome the defects of which mention has been made, and my device is operative under any condition of use of an automotive vehicle, or any other, engine to continuously maintain the engine and its cooling system at desired temperature which is predetermined to be proper.

It might be stated that while the device of the invention as disclosed includes a smaller, inner valve and a larger, outer valve, said device could additionally include one or more valves intermediate said smaller, inner valve and said larger, outer valve. In such event, the smaller, inner valve would desirably be opened first in the manner as described, the next adjacent intermediate valve would be opened next after the smaller, inner valve had reached wide open position, and the larger, outer valve would be opened after the intermediate valve, or valves, had reached wide open position. The principle would be the same, but mechanism generally similar to that for opening the larger, outer valve would be included to open each intermediate valve in about the manner the larger, outer valve is opened.

In Figs. 7, 8 and 9 there is disclosed a thermostatically actuated device of modified construction made according to the invention.

In Fig. 7 numeral 54 represents the jacket of an automotive vehicle engine, 55 the automotive vehicle radiator, 56 a connection between the jacket and radiator, 57 a connection (partially broken away) between the radiator and jacket, and 58 indicates the pump in the connection 57. The flow of the cooling medium or fluid is from the jacket 54 to the radiator 55 through the connection 56 and from the radiator back to the jacket through the connection 57 and the pump 58.

The modified thermostatically actuated device, denoted 59, is incorporated in the connection 56. Said device 59 accompishes all of the service which is accomplished by the device 20, and in substantially the same manner.

A cylindrical housing 60 of the device 59 is open at its lower end, and the upper end of said housing 60 merges, as at 61, in a downwardly and inwardly extending, or tapered, annular valve seat 62 for the same purpose as the valve seat 23.

The housing 60 is about half the length of the housing 21 before described, and integrally supports a small frame which is partially within and partially below said housing. Said small frame consists of a lower base 63 at some distance below the bottom of the housing, an upper base 64 within the lower portion of the housing in spaced relation to the top thereof, and legs 65 connecting the lower and upper bases with each other. The lower base 63 and the upper base 64 extend transversely of the housing 60, and the legs 65 are attached to the opposite end portions of the bases 63 and 64, respectively. Upper portions of said legs 65 are soldered, welded, or otherwise fastened, to the housing wall.

The lower base 63 conveniently supports a metal cylinder 66 having integral base 67 resting upon said lower base. A closed rubber sack 68 within said metal cylinder 66 has its lower portion or base cemented between the base 67 of the cylinder 66 and a metal disc plate 69 which is within the bottom of the rubber sack and is co-extensive with the lower portion or base of said sack. A threaded stud 70 which is integral with the disc plate 69 extends downwardly from said disc plate through the lower base of the rubber sack, the base 67 of the cylinder 66 and the lower base 63, and a nut 71 upon said stud is turned home against the bottom surface of said lower base 63 to clamp the plate 69, the base of the rubber sack and the base 67 of the cylinder 66 to each other and down against the lower base 63. Additionally, the base 67 of the cylinder 66 can be soldered, welded, or otherwise fastened, to the lower base 63. The body portion of the rubber sack 68 is closely adjacent to or contiguous with the wall of the cylinder 66, and is free of connection with said wall. The rubber sack has its upper portion or base cemented to a metal disc plate 72 which is within the top of the rubber sack and is co-extensive with the upper portion or base of said sack. The rubber sack contains a volatile liquid 73. A plunger or stem 74 which is integral with the disc plate 72 extends upwardly from said disc plate through the upper base of the rubber sack. Said plunger or stem 74 is equivalent to the plunger or stem 28, being for the same purpose and operating in the same manner.

All of the members 66, 67, 68, 69, 70, 71, 72 and 73 cooperate to provide a thermostatic element substituted in the modified device for the bellows or tubular member 27 of Figs. 1 to 6. The rubber sack 68 is the power element for closing the smaller, inner valve, and the volatile liquid in the sack is the power element for opening the valves. The sack 68 while described as of rubber, may be of any other elastic material suitable to the purpose. The arrangement is such that at lower temperatures, the material of the sack is under stretched tension holding the smaller valve closed, while at higher temperatures the liquid volatilizes and elongates or expands the sack.

The plunger or stem 74 is slidably guided in an opening 75 in the upper base 64, and said plunger or stem extends to position slightly above said upper base when the sack 68 is contracted or shortened, as it is shown in Fig. 8.

A smaller diameter stem 76 is adjustably threaded, as at 77, into the plunger or stem 74 to extend upwardly from said plunger or stem 74, and the upper portion of the stem 76 carries a conical valve 78, equivalent to the valve 32 and for the same purpose.

A disc plate 79 is equivalent to the disc plate 35, and includes an outer circumferential portion 80 for engaging the annular valve seat 62, as well as an inner circumferential portion 81 to be engaged by the conical valve 78. The portions 80 and 81 are equivalent to the portions 36 and 37, respectively.

When the rubber sack 68 is at lower temperatures, it holds the conical valve 78 at its farthest inward or downward position, and said conical valve engages against the annular valve seat 81 and presses the outer circumferential portion 80 of the disc plate 79 down against the annular valve seat 62, all as before explained in connection with Figs. 1 to 6.

Means for resiliently holding the outer circumferential portion 80 of the disc plate 79 in engagement with the annular valve seat 62 when the conical valve is raised from its seat, consists of a coil spring 82 upon the stem 76 and having its upper end bearing against the lower surface of said conical valve and its lower end bearing against the upper surface of a cup-shape member or yoke 83, equivalent to the cup-shape member or yoke 44, suitably attached to the disc plate 79 about the inner circumferential portion 81 thereof.

The inner circumferential portion 81 and the outer circumferential portion 80 of the disc plate 79 includes knife edges equivalent to the knife edges 42 and 43 before described and adapted to function in precisely the same manner.

The cup-shape member or yoke 83 has the same relation to the upper end of the plunger or stem 74 that the cup-shape member or yoke 44 has to the upper end of the plunger or stem 28.

The thermostatically actuated device 59 is placed in the connection 56 by the employment of two pieces of rubber hose, denoted 84 and 85, respectively, the former being clipped to an upper portion of the connection 56 and to the upper portion of the housing 60, and the latter being clipped to a lower portion of said connection and to the lower portion of said housing. The housing 60, the two pieces of hose and the remainder of the connection 56 provide a fluid-proof passage leading from the jacket 54 to the radiator 55. The disclosure of Fig. 7 includes no by-pass.

The disc plate 79 includes an air outlet port 86 which is controlled by a valve 87, similar in all respects to the valve 53 and similarly operated.

The device of Figs. 7, 8 and 9 operates in substantially the manner as described in connection with the disclosure of Figs. 1 to 6.

What is claimed is:

1. A thermostatically actuated device of the character described, comprising a housing having a passage, a valve seat surrounding said passage, a plate including an outer margin adapted to engage said valve seat to provide therewith a relatively large valve, said plate including an inner margin providing a second valve seat, a valve member adapted to engage said second valve seat to provide therewith a relatively small valve, said valve member and said surrounding valve seat being at opposite sides of said plate and said small and large valves being adapted when in closed position to completely close said passage of said housing, an expansible and contractible thermostatic element for causing said relatively small valve to be opened and closed while said relatively large valve is closed, resilient means urging said relatively large valve toward closed position, and means operative in response to expansion of said element while said relatively small valve is open to cause said relatively large valve to be opened against the action of said resilient means, said means operative in response to expansion of said element to cause said relatively large valve to be opened including a perforated yoke constituted as a straining member for fluid attached to said plate at the side thereof adjacent said thermostatic element and surrounding said relatively small valve and adjacent to said relatively large valve.

2. A device for controlling passage of cooling medium from a jacket to a radiator of an engine cooling system, comprising a plurality of cooperating means for completely arresting passage of cooling medium from said jacket to said radiator when said means are in closed position, and mechanism for progressively moving said means one after another to open position and for progressively moving each means between closed and wide open position in response to rise of temperature of said cooling medium, one of said means having potential to normally close, and said mechanism being responsive to fall of temperature of said cooling medium to permit said means having potential to close to become progressively closed while another of said means is wide open and to thereafter cause said other means to become progressively closed.

3. The combination with a member including a passage through which fluid is adapted to be forced under pressure, of a device for controlling travel of fluid through said passage, said device comprising a plurality of means adapted when in closed position to interrupt travel of fluid through said passage, said plurality of means including an adjustable member for permitting a flow of relatively small magnitude through said passage and an adjustable member for permitting a flow of comparatively greater magnitude through said passage, an element responsive to rise of temperature of fluid for progressively opening said relatively small flow magnitude member to provide a progressively increasing flow-way through said passage and for thereafter progressively opening said comparatively greater flow magnitude member to provide another progressively increasing flow-way through said passage, and spring means urging said comparatively greater magnitude flow member toward closed position, said element being responsive to fall of temperature of fluid to permit said comparatively great flow magnitude member to become progressively closed while said relatively small flow magnitude member is open and to thereafter cause said relatively small flow magnitude member to become progressively closed.

4. The combination with a member including a passage through which fluid is adapted to be forced under pressure, of a device for controlling travel of fluid through said passage, said device comprising a plurality of valves adapted when in closed position to interrupt travel of fluid through said passage, including a relatively small valve and a comparatively larger valve, an element responsive to rise of temperature of fluid for progressively opening said relatively small valve and for thereafter progressively opening said comparatively larger valve, and spring means urging said comparatively larger valve toward closed position against the action of said element, the element being responsive to fall of temperature of fluid to permit said comparatively larger valve to become progressively closed while said relatively small valve is open and to thereafter cause said relatively small valve to become progressively closed.

5. The combination with a member including a passage through which fluid is adapted to be forced under pressure, of a device for controlling travel of fluid through said passage, said device comprising a plurality of valves adapted when in closed position to interrupt travel of fluid through said passage, including a relatively small valve and a comparatively larger valve in surrounding relation to said relatively small valve, an element responsive to rise of temperature of fluid for progressively opening said relatively small valve and for thereafter progressively opening said comparatively larger valve, and spring means urging said comparatively larger valve toward closed position against the action of said element, the element being responsive to fall of temperature of fluid to permit said comparatively larger valve to become progressively closed while said relatively small valve is open and to thereafter cause said relatively small valve to become progressively closed.

6. The combination with a member including a passage through which fluid is adapted to be forced under pressure and a valve seat surrounding said passage, of a device for controlling travel of fluid through said passage comprising a plate including an outer margin adapted to engage said valve seat to provide therewith a relatively large valve, said plate including an inner margin providing a second valve seat, a valve member adapted to engage said second valve seat to provide therewith a relatively small valve, said valve member and said surrounding valve seat being at opposite sides of said plate and said small and large valves being adapted when in closed position to completely close said passage, an element responsive to rise and fall of temperature of fluid for opening and closing said relatively small valve while said relatively large valve remains closed, and spring means for urging said relatively large valve toward closed position against the action of said element, the element being adapted to open said relatively large valve and permit the relatively large valve to close while said relatively small valve is open.

7. A thermostat for controlling passage of cooling medium from a jacket to a radiator of an engine cooling system, comprising a plurality of valves adapted when in closed position to arrest passage of cooling medium from said jacket to said radiator, a heat responsive entity operative upon rise of temperature of the cooling medium to cause one of said valves to open progressively, and means actuated by said heat responsive entity operative upon rise of temperature of said cooling medium after said first mentioned valve is wide open to cause another of said valves to open progressively while the first mentioned valve remains wide open.

8. A thermostat for controlling passage of cooling medium from a jacket to a radiator of an engine cooling system, comprising a plurality of cooperating valves, and means operative in response to temperature changes of said cooling medium for actuating said valves, said valves being adapted to open and close progressively one after the other to thus progressively and continuously regulate the amount of cooling medium which travels past said valves and the temperature of said cooling medium.

9. The combination with a member including a passage through which fluid is adapted to be forced under pressure, of a device for controlling travel of fluid through said passage, said device comprising a plurality of means adapted when in closed position to interrupt travel of fluid through said passage, said plurality of means including a member for permitting a flow of relatively small flow magnitude through said passage and a member for permitting a flow of comparatively greater magnitude through said passage, and an element responsive to rise of temperature of fluid for progressively opening such relatively small flow magnitude member to provide a progressively increasing flow-way through said passage and for thereafter progressively opening said comparatively greater flow magnitude member to provide another progressively increasing flow-way through said passage, said comparatively greater magnitude flow member having potential urging it toward closed position, said element being responsive to fall of temperature of fluid to permit said comparatively great flow magnitude member to become progressively closed while said relatively small flow magnitude member is open and to thereafter cause said relatively small flow magnitude member to become progressively closed.

HARRY ROSE.